United States Patent [19]
Uriya et al.

[11] Patent Number: 5,412,696
[45] Date of Patent: May 2, 1995

[54] ELECTRONIC CIRCUIT READILY CAPABLE OF CONTROLLING EXTENT OF A RADIO COMMUNICATION ZONE

[75] Inventors: Susumu Uriya, Tokyo; Atunori Nakamura, Kanagawa, both of Japan

[73] Assignee: NEC Corporation, Tokyo, Japan

[21] Appl. No.: 982,989

[22] Filed: Nov. 30, 1992

[30] Foreign Application Priority Data

Nov. 30, 1991 [JP] Japan .................................. 3-342375

[51] Int. Cl.$^6$ .............................................. H04L 7/00
[52] U.S. Cl. .................................. 375/354; 370/100.1; 327/172
[58] Field of Search .................... 375/106, 108, 60; 370/110.1, 95.1, 95.3, 100.1; 307/265, 260, 268, 269, 267

Primary Examiner—Stephen Chin
Assistant Examiner—Hai H. Phan
Attorney, Agent, or Firm—Sughrue, Mion, Zinn, Macpeak & Seas

[57] ABSTRACT

For use in a time division multiple access system and comprising a signal processing circuit (14, 15) which is for processing a local signal into a data burst under control by a burst control pulse having a control pulse width (T1), an electronic circuit comprises a control part (12) responsive to a sequence of data signals to produce a data pulse comprising a particular signal (PS) previous to a data time slot (TS) having a time slot width equal to the control pulse width. In addition, the control part produces an additional control pulse in accordance with the data signal sequence. In accordance with the burst control and the additional control pulses, a signal generator (13) processes the data pulse into a processed signal to supply the processed signal as the local signal to the signal processing circuit. Preferably, the additional control pulse has a width (T2) which is equal to that of data pulse.

5 Claims, 2 Drawing Sheets

ELECTRONIC CIRCUIT READILY CAPABLE OF CONTROLLING EXTENT OF A RADIO COMMUNICATION ZONE

BACKGROUND OF THE INVENTION

This invention relates to an electronic circuit for use in a time division multiple access (often abbreviated to TDMA) system. The TDMA system is widely used in various radio communication units. One of the radio communication units may be a digital radio telephone set using $\pi/4$-shift QPSK modulation. For convenience of understanding, description will be mainly directed to the digital radio telephone set.

The telephone set comprises an electronic circuit which is supplied with a sequence of data signals on carrying out a predetermined communication to produce a data burst under control by a burst control pulse which is known in the art. The data burst carries the data signal sequence.

In the manner which will later be described, the conventional electronic circuit comprises a signal producing and a signal processing circuit. Each of the data signals is divided into a plurality of symbols each of which is represented by two bits. By the use of an impulse response which is known in the art, the signal producing circuit carries out an arithmetic operation on a current one of the symbols to produce a local signal under control by the burst control pulse.

The signal processing circuit is for processing the local signal into the data burst during presence of the burst control pulse. The data burst has a plurality of leading edges. It is assumed that the leading edges may be different from one another in form. This is because the impulse response is produced dependent on several symbols previous to the current symbol.

The telephone set has a communication zone in which the predetermined communication can be carried out. It is to be noted that the communication zone has an extent which is determined dependent on each of the forms of the leading edges. Inasmuch as the leading edges may have various forms, it is difficult in the electronic circuit to control the extent of the communication zone.

SUMMARY OF THE INVENTION

It is therefore an object of this invention to provide an electronic circuit which is readily capable of controlling extent of a communication zone in a radio communication unit.

It is another object of this invention to provide an electronic circuit of the type described, which is capable of producing a data burst having a plurality of leading edges which are common in form.

Other object of this invention will become clear as the description proceeds.

According to this invention, there is provided an electronic circuit for use in a time division multiple access system and responsive to a sequence of data signals for producing a data burst carrying the data signal sequence. The circuit comprises a signal producing circuit for producing a local signal in accordance with the data signal sequence and with a burst control pulse generated in the signal producing circuit to have a control pulse width and a signal processing circuit for processing the local signal into the data burst during presence of the burst control pulse. The signal producing circuit comprises first producing means for producing a data pulse in accordance with the data signal sequence. The data pulse has a data time slot and comprises a particular signal previous to the data time slot. The data time slot has a time slot width equal to the control pulse width. The signal producing circuit further comprises second producing means for producing an additional control pulse in accordance with the data signal sequence and local processing means connected to the first and the second producing means and the signal processing circuit for processing the data pulse into a processed signal in accordance with the burst control and the additional control pulses to supply the processed signal as the local signal to the signal processing circuit.

DESCRIPTION OF THE PREFERRED EMBODIMENT

Figure 1:
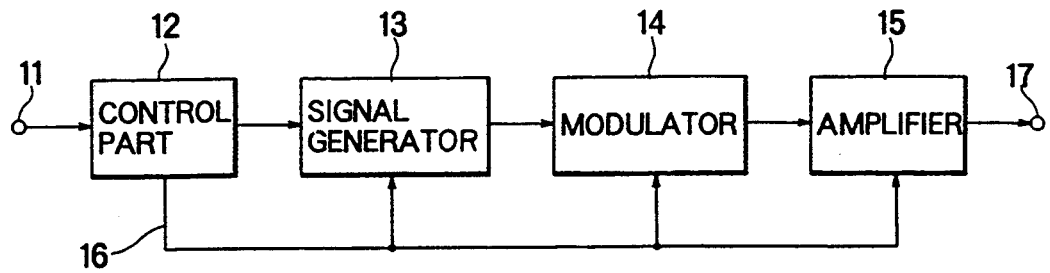
FIG. 1 is a block diagram of a conventional electronic circuit.

Referring to FIG. 1, a conventional electronic circuit will first be described for a better understanding of the present invention. The electronic circuit is for use in a TDMA system and is included in a digital radio telephone set using $\pi/4$ shift QPSK modulation. The telephone set has a communication zone in which the predetermined communication can be carried out.

The electronic circuit is for producing a data burst in response to a sequence of data signals which is supplied through an input terminal 11. The data signal sequence is related to a speech signal or the like. The data burst carries the data signal sequence. The electronic circuit comprises a control part 12, a signal generator 13, a modulator 14, and an amplifier 15, each of which will be described in the following.

The control part 12 is supplied with the data signal sequence and produces a succession of data pulses and a succession of burst control pulses. The burst control pulse succession is supplied through a control line 16 to each of the signal generator 13, the modulator 14, and the amplifier 15. The control line 16 will be referred to as a pulse supplying arrangement.

The signal generator 13 is connected to the control part 12 and the modulator 14 and carries out an arithmetic operation on the data pulse succession by the use of an impulse response in the manner known in the art. The impulse response will presently be discussed. As a result of the arithmetic operation, the signal generator 13 generates a local signal. Responsive to each of the burst control pulses, the signal generator 13 supplies the local signal to the modulator 14. A combination of the control part 12, the signal generator 13, and the control line 16 is referred to as a signal producing circuit. The arithmetic operation will presently be described in detail.

Each of the data pulses is divided into a plurality of symbols each of which corresponds to two bits. The arithmetic operation is carried out on a current one of the symbols. On carrying out the arithmetic operation, the impulse response is theoretically given an infinite length. This is because a Nyquist filter or the like (not shown) is generally used in order to produce the impulse response. In practice, the signal generator 13 is designed so that arithmetic operation is carried out on the current symbol by the use of the impulse response that is related only to several symbols previous to the current symbol.

The modulator 14 is connected to the amplifier 15 and is for modulating the local signal into a modulated signal. During presence of each of the burst control pulses, the modulator 14 supplies the modulated signal to the amplifier 15. The amplifier 15 is for amplifying the modulated signal into an amplified signal. During presence of each of the burst control pulses, the amplifier 15 sends the amplified signal as the data burst to an output terminal 17. A combination of the modulator 14 and the amplifier 15 is referred to as a signal processing circuit.

Figure 2:
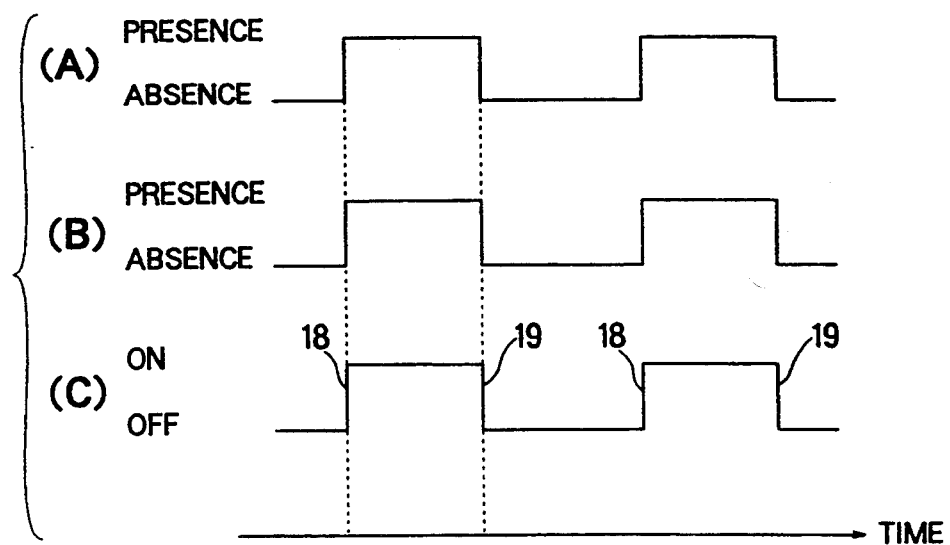
FIGS. 2(A) through (C) shows time charts for use in describing operation of the electronic circuit illustrated in FIG. 1.

Turning to FIG. 2, the description will be made as regards operation of the conventional electronic circuit. It is assumed that the signal generator 13 does not have a delay time even when it carries out the arithmetic operation. The burst control pulse succession is depicted along a top or first line labelled (A). The data pulse succession is depicted along a second line labelled (B). The data burst is exemplified as two burst pulses along a bottom or third line labelled (C). It is to be noted that synchronization is established among the data pulse succession, the burst control succession, and the data burst.

The data burst has a plurality of leading edges 18 and a plurality of trailing edges 19 as will become clear from the figure in the bottom line. The leading edges 18 may be different from one another in form although representation is omitted from the bottom line. The communication zone has an extent in which the digital radio telephone set can carry the predetermined communication and which is determined dependent on forms of the leading edges. Therefore, it has been difficult to control the extent of the communication zone.

Figure 3:
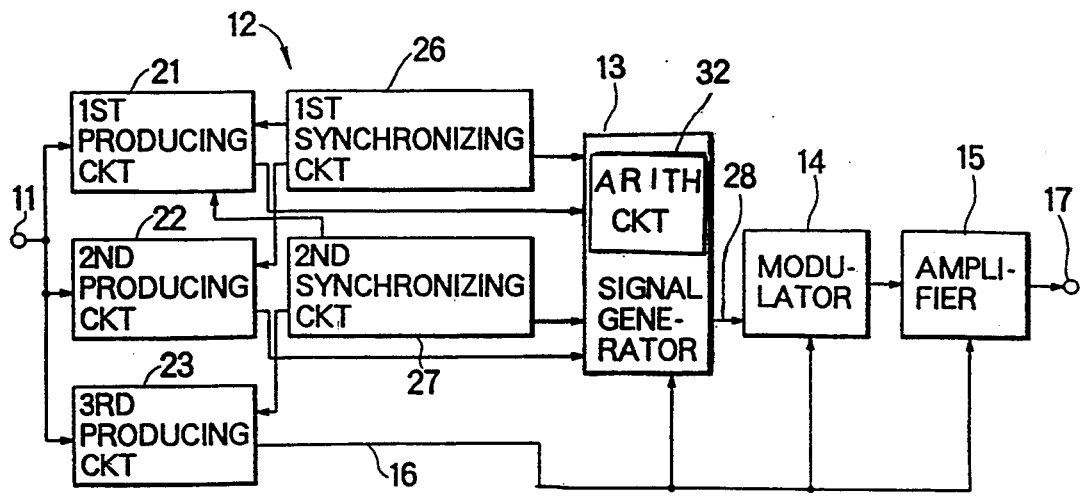
FIG. 3 is a block diagram of an electronic circuit according to an embodiment of the instant invention.

Turning to FIG. 3, the description will be directed to an electronic circuit according to an embodiment of this invention. The electronic circuit comprises similar parts designated by like reference numerals.

The electronic circuit is for use in the TDMA system and is included in the digital radio telephone set. In the electronic circuit, the control part 12 comprises first, second, and third producing circuits 21, 22, and 23, each of which will be described in the following. The first producing circuit 21 is for producing the data pulse succession in accordance with the data signal sequence that is supplied through the input terminal 11.

In the manner which will be described, each of the data pulses has a data time slot and comprises a particular and a specific signal. The data time slot is 280 bits long and comprises a main part, a first supplementary part preceding the main part, and a second supplementary part following the main part. The main part is for carrying the data signal sequence. Each of the first and the second supplementary parts is several bit long, each bit being a logic "0". Each of the first and the second supplementary parts is operable as a ramp-up part which is known in the art. Each of the data pulses has a data pulse width. The data time slot has a time slot width. Each of the data pulse width and the time slot width will become clear in the following.

The particular signal is previous to the data time slot. The specific signal follows the data time slot. Each of the particular and the specific signals has a length of a first predetermined number of, for example, four bits, all being logic "0", and may therefore be called an all space signal.

The second producing circuit 22 is for producing a succession of additional control pulses in accordance with the data signal sequence. The additional control pulse succession is supplied to the signal generator 13. Each of the additional control pulses has an additional pulse width equal to the data pulse width. Thus, as can be seen from FIG. 4, the first producing circuit 21 and the second producing circuit 22 produce a pulse having a pulse width which is greater than the data time slot width by the width of the particular signal PS plus the specific signal SS.

The third producing circuit 23 is for producing the burst control pulse succession in accordance with the data signal sequence. In the manner described above, the burst control pulse succession is supplied through the control line 16 to each of the signal generator 13, the modulator 14, and the amplifier 15. Each of the burst control pulses has a control pulse width equal to the time slot width.

The control part 12 further comprises first and second synchronizing circuits 26 and 27. The first synchronizing circuit 26 is connected to the first and the second producing circuits 21 and 22 and is for establishing synchronization between the data pulse succession and the additional control pulse succession. The second synchronizing circuit 27 is connected to the first and the third producing circuits 21 and 23 and is for establishing synchronization between the data time slot and one of the burst control pulses.

The signal generator 13 is connected to the first and the second producing circuits 21 and 22 and the modulator 14 and is for processing the data pulse succession into a processed signal in accordance with the burst control pulse succession and the additional control pulse succession. More particularly, the signal generator 13 is connected to the first and the second synchronizing circuits 26 and 27 and is for processing the above-mentioned arithmetic operation on the data pulse succession (comprising the particular signal PS, the data time slot TS and the specific signal SS) during presence of each of the additional control pulses (of pulse width T2) to produce an arithmetic result signal representative of a result of the arithmetic operation. The arithmetic circuit 32 carries the arithmetic operation on the current symbol by the use of the impulse response that is related only to a second predetermined number of, for example, four symbols previous to the current symbol. On carrying out the arithmetic operation, the signal generator 13 is operable as an arithmetic processing arrangement.

During presence of each of the burst control pulses (of pulse width T1), the signal generator 13 supplies the arithmetic result signal as the processed signal or the local signal to the modulator 14 through a signal line 28 which will be referred to as a signal supplying arrangement. A combination of the signal generator 13 and the signal line 28 will be referred to as a local processing arrangement. A combination of the control part 12, the signal generator 13, and the signal line 28 is referred to herein as the signal producing circuit.

The modulator 14 modulates the local signal into the modulated signal. During presence of each of the burst control pulses, the modulator 14 supplies the modulated signal to the amplifier 15. The amplifier 15 amplifies the modulated signal into the amplified signal. During presence of each of the burst control pulses, the amplifier 15 sends the amplified signal as the data burst to the output terminal 17.

Figure 4:
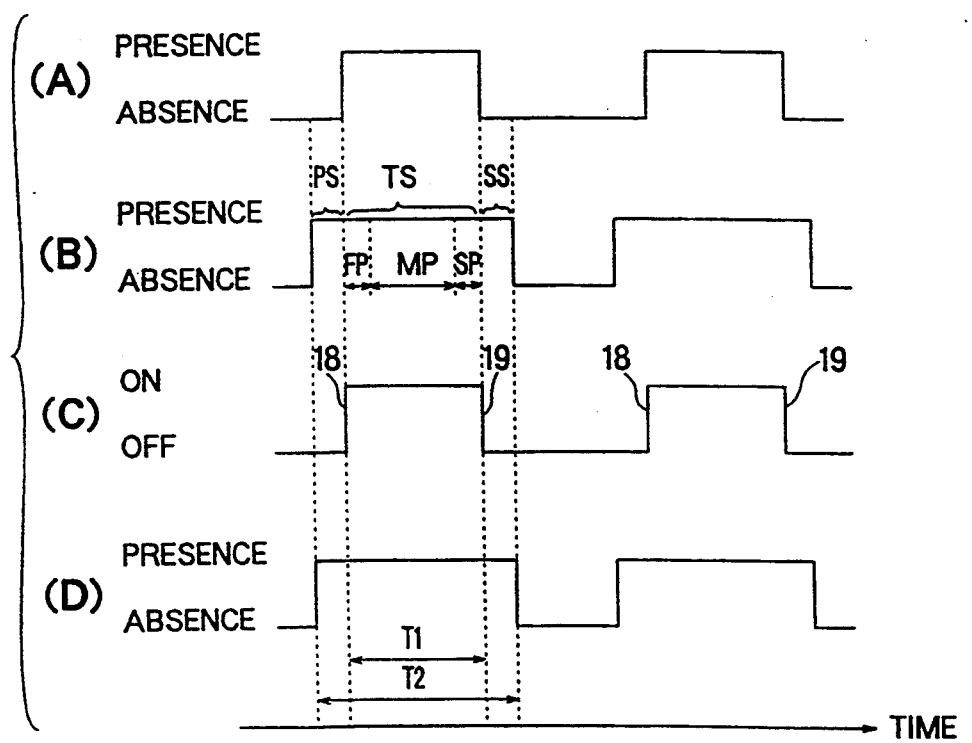
FIGS. 4(A) through (D) shows time charts for use in describing operation of the electronic circuit illustrated in FIG. 3.

Turning to FIG. 4, the description will be made as regards operation of the electronic circuit. It is assumed that the signal generator 13 does not have a delay time even when it carries out the arithmetic operation. The burst control pulse succession is depicted along a top or first line labelled (A). The data pulse succession is depicted along a second line labelled (B). As two burst pulses, the data burst is depicted along a third line labelled (C). The additional control pulse succession is depicted along a bottom or fourth line labelled (D).

Each of the control pulse width and the time slot width is represented by T1 in the figure. Each of the data pulse width and the additional pulse width is represented by T2. The data time slot is labelled TS in the figure. The particular signal is labelled PS. The specific signal is labelled SS. The main part is labelled MP. The first supplementary part is labelled FP. The second supplementary part is labelled SP.

The leading edges 18 are similar to one another in form. This is because the arithmetic operation is carried out by the use of the impulse response that is produced dependent on the particular signal at a time instant when the burst signal turns from OFF to ON. Therefore, the electronic circuit is readily capable of controlling the extent of the communication zone.

While the present invention has thus far been described in connection with only a single preferred embodiment thereof, it will readily be possible for those skilled in the art to put this invention into practice in various other manners. For example, the second predetermined number may be different from four. The first predetermined number may be greater than the second predetermined number.

What is claimed is:

1. An electronic circuit for use in a time division multiple access system and responsive to a data signal sequence for producing a data burst carrying said data signal sequence, said electronic circuit comprising a signal producing circuit for producing a local signal in accordance with said data signal sequence and with a burst control pulse having a control pulse width generated in said signal producing circuit and a signal processing circuit for processing said local signal into said data burst during presence of said burst control pulse, wherein said signal producing circuit comprises:
   first producing means for producing a data pulse, having a data pulse width, in accordance with said data signal sequence, said data pulse having a data time slot and comprising a particular signal previous to said data time slot, said first producing means keeping said data time slot at a time slot width equal to said control pulse width;
   second producing means for producing an additional control pulse in accordance with said data signal sequence wherein said additional control pulse has an additional control pulse width equal to said data pulse width;
   third producing means for producing said burst control pulse in accordance with said data signal sequence; and
   local processing means connected to said first producing means, said second producing means, said third producing means, and said signal processing circuit for processing said data pulse into a processed signal in accordance with said burst control pulse and said additional control pulse to supply said processed signal as said local signal to said signal processing circuit.

2. An electronic circuit as claimed in claim 1, wherein said signal producing circuit further comprising:
   first synchronizing means connected to said first and said second producing means for establishing synchronization between said data pulse and said additional control pulse; and
   second synchronizing means connected to said first and said third producing means for establishing synchronization between said data time slot and said burst control pulse;
   said local processing means comprising:
   arithmetic processing means connected to said first and said second synchronizing means for processing an arithmetic operation on the data pulse during presence of said additional control pulse to produce an arithmetic result signal representative of a result of said arithmetic operation, and
   supplying said arithmetic result signal as said local signal to said signal processing circuit during the presence of said burst control pulse.

3. An electronic circuit as claimed in claim 1, wherein said signal producing circuit further comprises
   pulse supplying means connected to said signal processing circuit and said local processing means for supplying said burst control pulse to each of said signal processing circuit and said local processing means.

4. An electronic circuit as claimed in claim 1, wherein said signal processing circuit comprises:
   a modulator connected to said local processing means for modulating said local signal into a modulated signal; and
   an amplifier connected to said modulator for amplifying said modulated signal into said data burst during said presence of the burst control pulse.

5. An electronic circuit for use in a time division multiple access system and responsive to a data signal sequence for producing a data burst carrying said data signal sequence, said electronic circuit comprising a signal producing circuit for producing a local signal in accordance with said data signal sequence and with a burst control pulse having a control pulse width generated in said signal producing circuit and a signal processing circuit for processing said local signal into said data burst during presence of said burst control pulse, wherein said signal producing circuit comprises:
   first producing means for producing a data pulse, having a data pulse width, in accordance with said data signal sequence, said data pulse having a data time slot and comprising a particular signal previous to said data time slot and a specific signal following said data time slot, said first producing means keeping said data time slot at a time slot width equal to said control pulse width;
   second producing means for producing an additional control pulse in accordance with said data signal sequence wherein said additional control pulse having an additional control pulse width equals to said data pulse width;

third producing means for producing said burst control pulse in accordance with said data signal sequence; and local processing means connected to said first producing means, said second producing means, said third producing means, and said signal processing circuit for processing said data pulse into a processed signal in accordance with said burst control pulse and said additional control pulse to supply said processed signal as said local signal to said signal processing circuit.

* * * * *